United States Patent
Schueller

(10) Patent No.: US 9,393,450 B2
(45) Date of Patent: Jul. 19, 2016

(54) FIRE SUPPRESSION AERIAL DELIVERY SYSTEM

(71) Applicant: Kyle Schueller, Las Cruces, NM (US)

(72) Inventor: Kyle Schueller, Las Cruces, NM (US)

(*) Notice: Subject to any disclaimer, the term of this patent is extended or adjusted under 35 U.S.C. 154(b) by 355 days.

(21) Appl. No.: 13/851,321

(22) Filed: Mar. 27, 2013

(65) Prior Publication Data
US 2014/0290969 A1     Oct. 2, 2014

(51) Int. Cl.
*A62C 3/08*     (2006.01)
*A62C 19/00*    (2006.01)
*A62C 3/02*     (2006.01)
*B64D 1/16*     (2006.01)

(52) U.S. Cl.
CPC ............... *A62C 3/025* (2013.01); *A62C 3/0235* (2013.01); *B64D 1/16* (2013.01)

(58) Field of Classification Search
CPC ........ A62C 3/08; A62C 3/0228; A62C 3/025; A62C 3/0235; A62C 5/006; A62C 19/00
USPC .................. 169/46, 53, 28; 239/171
See application file for complete search history.

(56) References Cited

U.S. PATENT DOCUMENTS

| | | | | |
|---|---|---|---|---|
| 2,359,573 A | | 10/1944 | MacKay | |
| 2,515,832 A | * | 7/1950 | Mournaud | A62C 8/005 169/28 |
| 2,633,172 A | * | 3/1953 | Treiber | B65D 88/16 220/565 |
| 3,798,837 A | * | 3/1974 | Oehmke | A01G 9/102 220/62.19 |
| 3,897,829 A | * | 8/1975 | Eason | B64D 1/16 169/53 |
| 4,124,049 A | | 11/1978 | Yamaguchi | |
| 4,918,863 A | * | 4/1990 | Youssef | A01G 9/104 47/74 |
| 5,511,482 A | * | 4/1996 | DiPietropolo | F42B 12/72 102/293 |
| 5,778,984 A | | 7/1998 | Suwa | |
| 5,830,548 A | * | 11/1998 | Andersen | B28B 1/00 206/524.3 |
| 6,050,343 A | | 4/2000 | Garcia Calvo | |
| 6,125,942 A | | 10/2000 | Kaufman et al. | |
| 6,474,564 B2 | * | 11/2002 | Doshay | A62C 3/0228 239/36 |
| 6,800,351 B1 | * | 10/2004 | Pflug | B31D 3/005 156/166 |
| 7,121,353 B2 | * | 10/2006 | Setzer | A62C 3/025 102/367 |
| 7,614,456 B2 | * | 11/2009 | Twum | A62C 3/0235 169/30 |
| 8,480,034 B2 | * | 7/2013 | Goddard et al. | 244/137.3 |
| 8,746,355 B2 | * | 6/2014 | Demmitt | A62C 3/025 102/369 |
| 8,746,478 B2 | * | 6/2014 | Claeys | B65D 88/524 220/565 |
| 2006/0207774 A1 | * | 9/2006 | Payassis | A62C 25/00 169/53 |
| 2006/0265952 A1 | * | 11/2006 | Christal | A01C 1/04 47/65.7 |
| 2007/0007021 A1 | | 1/2007 | Regan | |
| 2007/0079972 A1 | * | 4/2007 | Gross | 169/46 |
| 2008/0202772 A1 | | 8/2008 | Twum | |
| 2010/0018724 A1 | | 1/2010 | Cleary et al. | |
| 2010/0126740 A1 | * | 5/2010 | Hartmann | A62C 3/025 169/70 |
| 2012/0067973 A1 | * | 3/2012 | Cleary | A62C 3/0235 239/171 |
| 2012/0145026 A1 | * | 6/2012 | Chastain | F41H 13/00 102/301 |
| 2013/0048317 A1 | * | 2/2013 | Charlton | A62C 3/025 169/46 |
| 2013/0292142 A1 | * | 11/2013 | Goddard | A62C 3/0235 169/46 |

* cited by examiner

*Primary Examiner* — Arthur O Hall
*Assistant Examiner* — Joseph A Greenlund
(74) *Attorney, Agent, or Firm* — Kevin Soules; Kermit D. Lopez; Luis M. Ortiz

(57) ABSTRACT

A method, system, and apparatus for the aerial delivery of fire suppressant comprising of an exterior shell with at least one input port, at least one output port, and at least one pocket. At least two skids affixed to the bottom of the exterior shell and a bladder is formed inside the exterior shell. A detonation cord affixed to the bladder and a detonation device are arranged in the at least one pocket and operably connected to the detonation cord configured to release a liquid contained in the bladder.

17 Claims, 7 Drawing Sheets

```
                          ┌─ 700
      705 ─( Start )
             │
710 ─[ Construct shell with biodegradable cardboard ]
             │
712 ─[ Fill cardboard structure with seed ]
             │
714 ─[ Form bladder of biodegradable plastic ]
             │
716 ─[ Ship biodegradable shell assembly and
       bladder/detonation cord assembly to airfield ]
             │
718 ─[ Join biodegradable shell assembly with
       bladder/detonation assembly ]
             │
720 ─[ Fill bladder with desired fluid, and cap ]
             │
722 ─[ Load assembled internal bladder and
       biodegradable shell on aircraft ]
             │
724 ─[ Prepare payload for deployment ]
             │
726 ─[ Assemble detonator, operably connect to
       detonation cord, and install detonator in pocket ]
             │
728 ─[ Deploy containers over drop zone. ]
             │
730 ─[ Detonator device triggers detonator cord
       releasing fire retardant seed on target
       area ]
             │
      735 ─( End )
```

FIG. 7

FIRE SUPPRESSION AERIAL DELIVERY SYSTEM

FIELD OF THE INVENTION

Embodiments are generally related to the field of firefighting. Embodiments are also related to methods and systems for aerial delivery of fire retardant.

BACKGROUND

Current methods for fighting fires involve dangerous water delivery schemes. These methods included coordinated efforts of low flying aerial tanker aircraft and water drop helicopters. However, such approaches are both dangerous and ineffective as they require aircraft to fly at dangerously low altitudes, exposing aircraft to very intense heat, and are not very accurate. Therefore, a need exists for better methods and systems for delivering fire retardant to a fire.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method, system, and apparatus for fighting fires.

It is another aspect of the disclosed embodiments to provide for an enhanced method, system, and apparatus for delivering liquid fire retardant to a fire.

It is yet another aspect of the disclosed embodiments to provide an enhanced method, system, and apparatus for transporting liquid fire retardant in a biodegradable container via an aerial vehicle and dispensing the liquid fire retardant on the fire.

The aforementioned aspects and other objectives and advantages can now be achieved as described herein. A method, system, and apparatus for aerial delivery of fire suppressant comprises an exterior shell with at least one input port, at least one output port, and at least one pocket. At least two skids are affixed to the bottom of the exterior shell and a bladder is formed inside the exterior shell. A detonation cord affixed to the bladder and a detonation device are arranged in the at least one pocket and operably connected to the detonation cord configured to release a liquid contained in the bladder.

Other forms in which embodiments of the invention can be manifest, and additional embodiments of the invention are described in the remainder of the description and claims provided.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 7 depicts a series of steps for fighting a fire with a fire suppression aerial delivery system.

DETAILED DESCRIPTION

The embodiments disclosed herein describe improved methods and systems for safe, effective, and environmentally friendly aerial fire fighting techniques. The embodiments include methods and systems for constructing a biodegradable exterior shell to house a biodegradable plastic bladder. The shell is held together with biodegradable twine and biodegradable glue. The bladder is fitted with a detonator cord. Once the bladder is inserted into the shell, it is filled with liquid fire retardant. The assembly is then loaded on an aircraft and delivered to a drop zone over a fire. A biodegradable detonation device is used to detonate the detonator cord thereby fragmenting the exterior shell and bladder dispensing the liquid/fire retardant over the fire.

Figure 1:
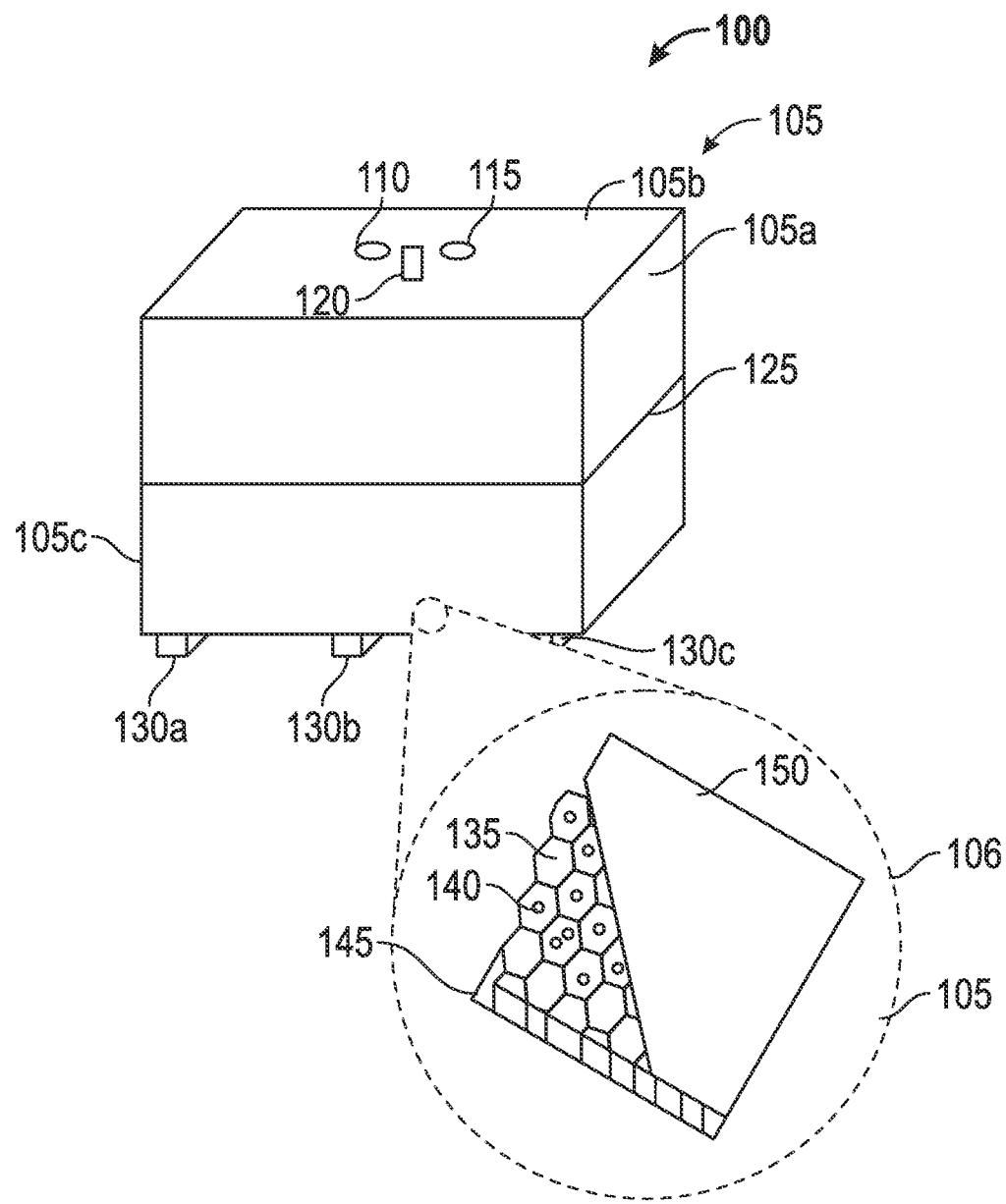
FIG. 1 depicts a perspective view of a fire suppression aerial delivery system.

FIG. 1 illustrates a perspective view of a fire suppression aerial delivery system 100 in accordance with an embodiment of the invention. The exterior shell 105 is formed of a biodegradable cardboard structure. An exploded view of this cardboard structure 106 is provided. The exterior shell is comprised of a lightweight rigid cardboard comprising a honeycomb pattern substrate 135 layered on the top and bottom with a single ply biodegradable, cardboard based, paper 145 and 150.

Exterior shell 105 can be premade and is selected because of its high strength to weight/material ratio. The exterior shell 105 is created with a top 105b, bottom 105c, and sides 105a of exterior shell 105, cut to the desired size. In one embodiment, the length of sides 105a, bottom 105c, and top 105b can range from 2 feet to 20 feet. Additionally, the thickness of the honeycomb substrate 135 and top 150 and bottom 145 layer can be selected from a range of thicknesses, depending on the expected weight of the fire retardant that will fill the system 100.

Figure 3:
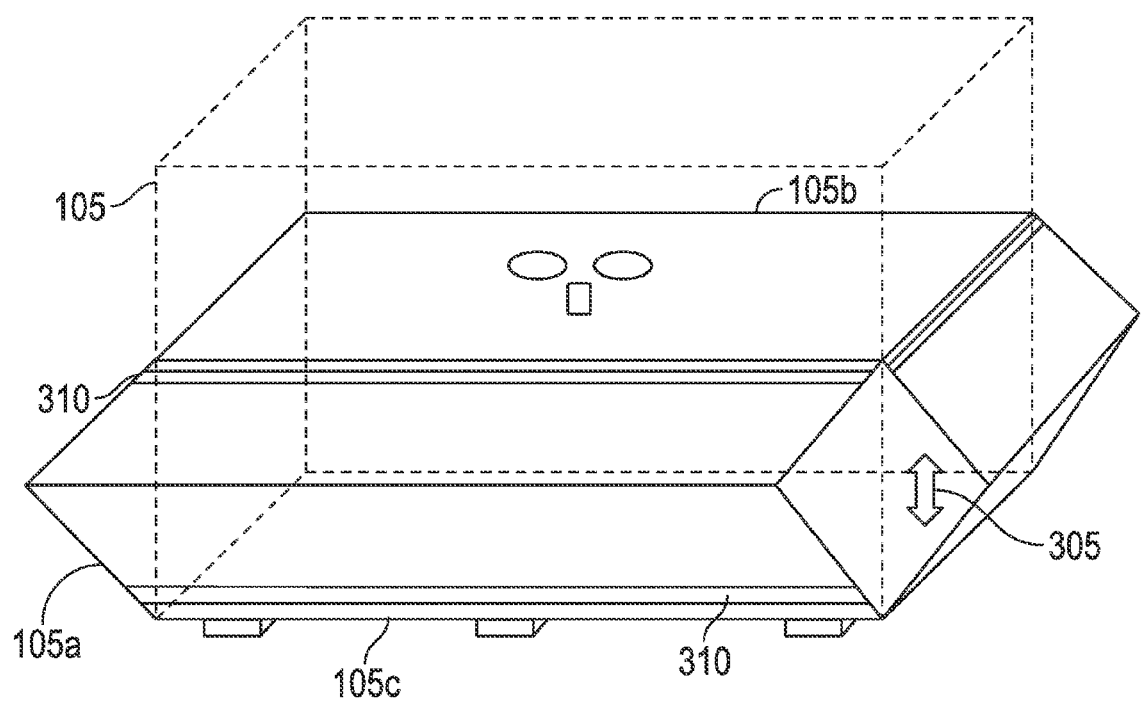
FIG. 3 depicts a perspective view of a fire suppression aerial delivery system being folded.

The sides 105a of the system 100 are scored through top layer 150, while bottom layer 145 is left in tact. This allows the side pieces 105a to bend easily, as illustrated in FIG. 3 below. Next, tabs (not shown) can be cut on all four sides 105a, top 105b, and bottom 105c of the exterior shell 105. The top layer 150 and honeycomb substrate 135 are then removed from the tabs, and a new layer is glued to the remaining bottom layer 145 of each tab using a biodegradable, starch based glue. The sides 105a are then assembled to the top 105b and bottom 105c by gluing the tabs in place using the biodegradable starch based glue.

Skids 130a, 130b, and 130c are next affixed to the bottom 105c. Skids 130a, 130b, and 130c can be bamboo veneer skin with a range of thicknesses from 0.0625 inches to 2.0 inches. Alternatively, the skids 130a, 103b, and 130c can be formed of thick honeycomb corrugated board. Each skid is glued using biodegradable starch based glue, along the entire length of the bottom 105c. The skids are placed to appropriately match the rolling cargo loading platform (not shown) being used. It should be appreciated that the number and location of skids may be varied according to the cargo loading platform.

The exterior shell 105 can be delivered to a fire fighting staging area as an independent unit. Once the bladder 400 (shown in FIGS. 4 and 5) is inserted into the exterior shell 105, the shell 105 can be secured with a biodegradable natural fiber rope or string 125, which is wrapped around the exterior of the shell 105 and tied together to reinforce the joints. This natural fiber rope 125 can be hemp or biodegradable twine, but any biodegradable fiber rope could be used equivalently. At least 5 feet more than the perimeter dimension of the system 100 is preferred.

The top 105b of the shell 105 is fitted with an input port 110 and an output port 115. These ports are aligned with related sleeves 415 and 420 on the bladder 400 for filling the system 100 with liquid/fire retardant. These ports can be formed to fit a range of standard hose sizes and can include caps to seal the liquid in the bladder, according to design preference. The top 105b of shell 105 is also formed to include a detonation device pocket 120. This pocket 120 allows a payload master to arm the detonation device in flight and store the detonation device in the pocket 120 when the system 100 is released over the drop zone. This reduces the risk of handling live explosives as the system 100 is being assembled, filled, and loaded.

The honeycomb structure 135 can be filled with a plurality of seeds such as seeds 140. The seeds can be selected to reseed the area destroyed by the fire. When the system 100 detonates, the seed is dispersed with the liquid fire retardant. The seeds 140 can be selected to match the naturally occurring foliage of the area and the dimension of the honeycomb structure 135 can be selected to accommodate the size and quantity of seeds as necessary.

Figure 2:
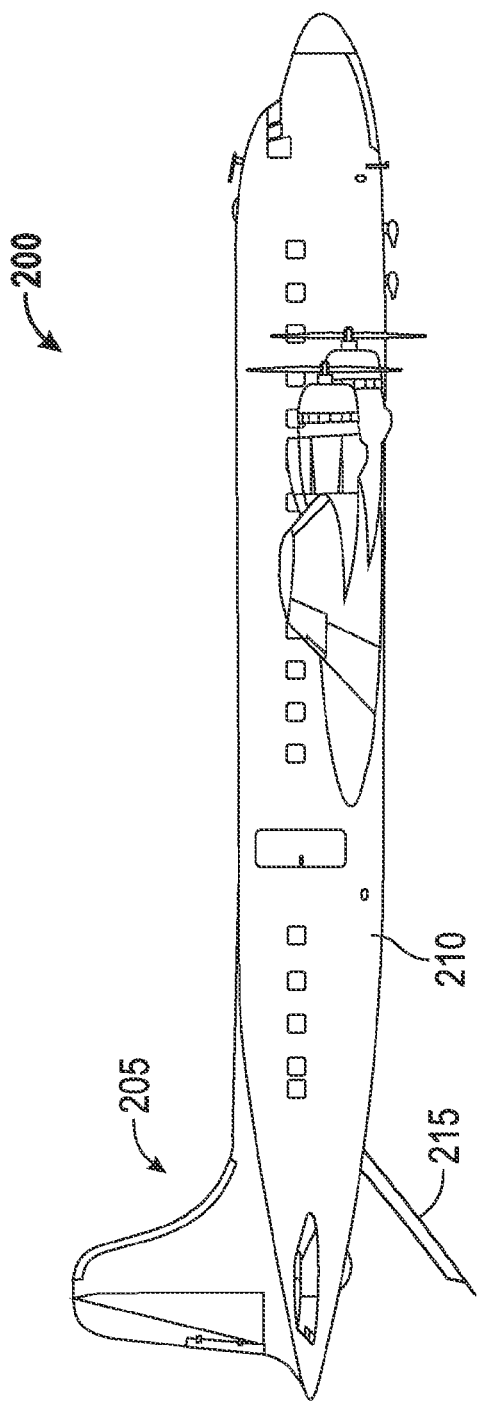
FIG. 2 depicts a side view of a fire suppression aerial delivery system.
Figure 2:
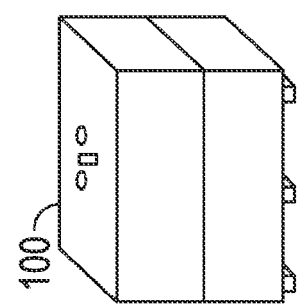

FIG. 2 illustrates the aerial delivery 200 of the system 100 to a specific location. The system 100 can be loaded onto an aerial vehicle 205. Commonly used aerial vehicles in fire fighting operations include low flying aerial tanker aircraft and water drop helicopters, but any suitable rear loading cargo aerial vehicle could serve as the aerial vehicle 205.

The system 100 can be loaded into the cargo hold 210 of an aerial vehicle 205. As the aerial vehicle 205 approaches the drop zone, the system 100 is prepared for deployment. The system 100 can be pushed out the back of the aerial vehicle 205. The aerial vehicle 205 can also be pitched up to take advantage of the force of gravity as the system 100 is pushed out the back. As the system 100 clears the ramp 215, a detonation safety pin (shown in FIGS. 6a and 6b) is pulled via a lanyard secured to the aircraft, arming the detonation device and starting the time delayed detonation.

The time delay of the detonation is determined before deployment according to the elevation of the aerial vehicle 205 above the terrain. This elevation may be primarily determined by the pilot according to conditions. Upon detonation, the system 100 can disperse the liquid fire retardant and seed approximately at the determined height above the target area. This height may be in the range of 10 to 5,000 feet. In the event that the timed detonation fails, a secondary impact detonation trigger 670 associated with the detonation device 600 is tripped when the system 100 impacts the ground.

FIG. 3 illustrates a perspective view of the system 100 being folded up and down in accordance with another embodiment. The shell 105 is designed to be shipped to a location as a collapsed assembly to save space and energy. In FIG. 3, shell 105 is shown semi-collapsed. Arrow 305 illustrates that the sides 105a of shell 105 can be folded down or expanded up.

FIG. 3 also illustrates that the top 105b, bottom 105c, and sides 105a can be wedded using a natural fiber stitching and/or biodegradable glue 310. In one embodiment, the exterior shell 105 can be pre-assembled but collapsed, as shown by arrow 305 in FIG. 3, for shipping. This allows the exterior shell 105 to be shipped to a staging area and then quickly formed into shell 105 on site.

Figure 4:
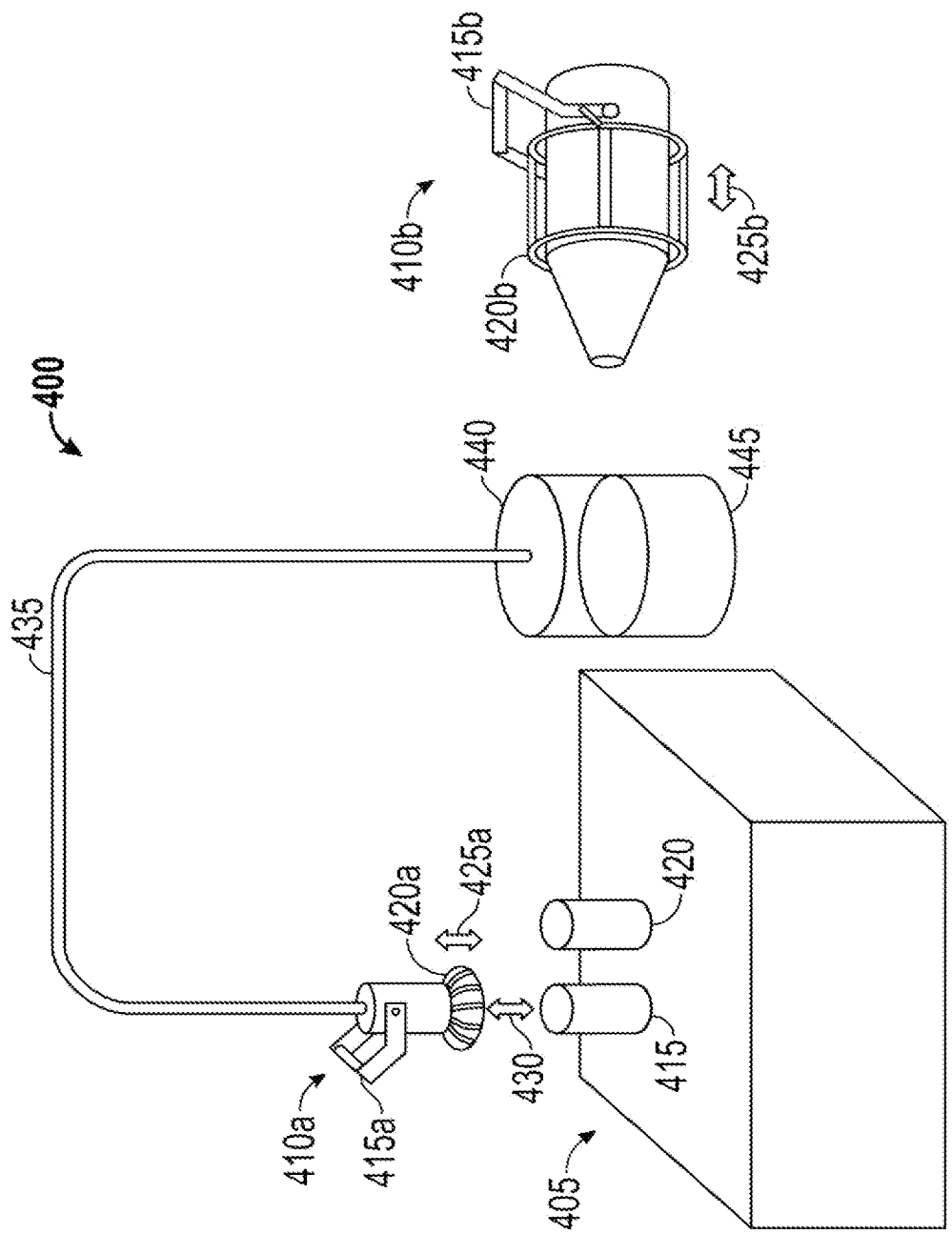
FIG. 4 depicts a schematic view of an internal bladder and hose assembly.

FIG. 4 illustrates an internal bladder and hose assembly 400. Internal bladder and hose assembly 400 includes an internal bladder 405 configured to hold a liquid fire retarding substance 445. The internal bladder 405 is made from thin biodegradable plastics such as Polylactic Acid Films. The bladder is initially shipped to a staging area empty. This reduces transportation costs. The internal bladder 405 can then be inserted inside shell 105. The internal bladder 405 includes a bladder input sleeve or port 415 and a bladder output sleeve or port 420. These sleeves 415 and 420 are arranged to align with, and engage, the input port 110 and output port 115 on the exterior shell 105.

Once the bladder 405 has been inserted inside the shell 105, liquid/fire retardant 445 can be injected from reservoir 440 into bladder 405 via a hose 435 and nozzle such as nozzle 410a or 410b. The liquid/fire retardant is preferably a liquid, but any equivalent fire retardant substance could be dispensed into bladder 405.

Nozzle 410a includes a release handle 415a and a flaring nozzle tip 420a. The flaring nozzle tip 420a can be lowered onto input sleeve 415 as indicated by arrow 430. The flaring nozzle tip is configured to be flexible and move as indicated by arrow 425a to seal around input sleeve 415. In another embodiment, nozzle 410b could be used in place of nozzle 410a. Nozzle 410b includes release handle 415b which actuates sliding collar 420b to engage input sleeve 415 as shown by arrow 425b and forms a seal with input sleeve 415. When either release handle 415a or 415b is activated, it allows flow of fire retardant 445 into bladder 405. The nozzle can then be removed by releasing release handle 415a or 415b. Once bladder 405 is filled, input sleeve 415 and output sleeve 420 can be capped or alternatively tied to prevent spilling.

It should be appreciated that the filling of bladder 405 is preferably preformed after bladder 405 has been inserted into exterior shell 105. For purposes of clarity, the internal bladder and hose assembly 400 is shown without exterior shell to illustrate the internal bladder and hose assembly 400.

Figure 5:
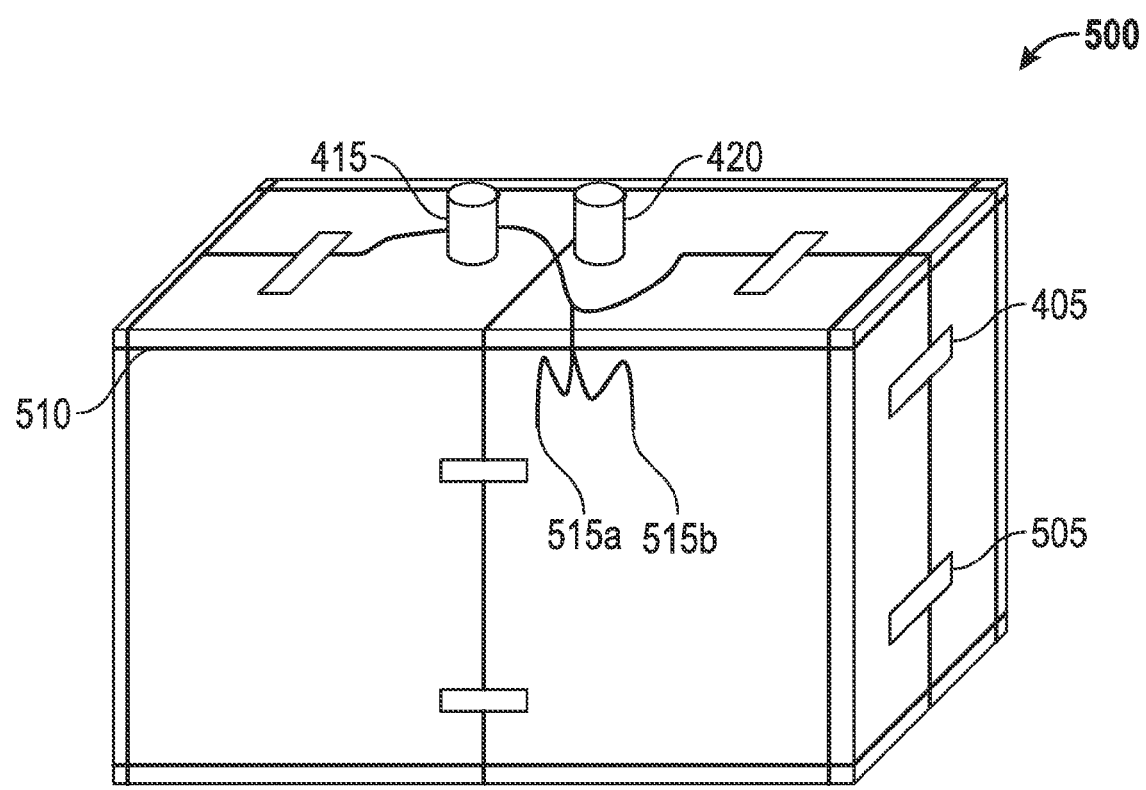
FIG. 5 depicts a perspective view of an internal bladder and detonator cord assembly.

FIG. 5 depicts an internal bladder and detonator assembly 500. Internal bladder 405 is fitted with a length of explosive detonator cord 510. Detonator cord 510 is fitted along the edges and midsections of internal bladder 405. Detonator cord 510 can be held to internal bladder 405 with thin biodegradable plastic strips 505 cut from the same material used to make internal bladder 405. The plastic strips 505 are welded to plastic bladder 405 over detonator cord 510. Detonator cord 510 can be relatively low yield at 50 grams/meter or less. It is only necessary that the detonator cord yield be high enough to section the cardboard shell 105 and rupture the bladder 405 thereby releasing the fire retardant 445 upon detonation.

Detonator cord 510 is securely fastened via plastic strips 505 to bladder 405. However, two lengths of detonator cord 515a and 515b are left loose. These lengths of detonator cord 515a and 515b are connection means for detonator cord 510 to detonation device 600, and in particular, receiving port 610 and 615 of the detonation device 600. Preferably a range of 12 to 120 inches are provided for this connection.

Figure 6A:
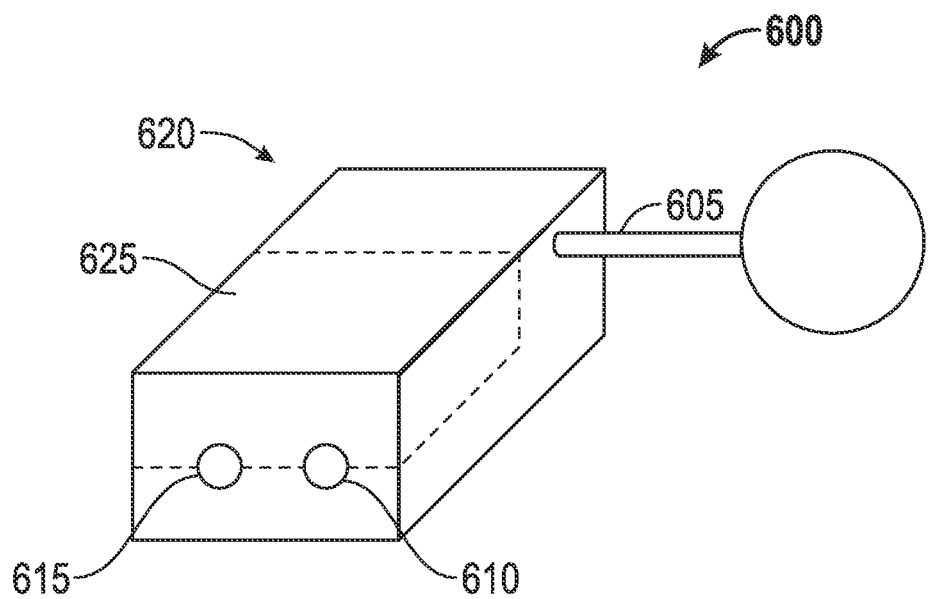
FIG. 6a depicts a perspective view of a detonation device.

FIG. 6a illustrates a detonator device 600 in accordance with another embodiment of the invention. Detonator device 600 includes two receiving ports 610 and 615 for operably connecting detonator device 600 to detonator cord 510. The detonator device 600 also includes a safety pin 605, which can be removed from the detonator device 600 to arm the device. In one embodiment, safety pin 605 can be connected to a lanyard that is further attached to a hook in aerial vehicle 205, such that as the device 100 is dropped out of aerial vehicle 205, the lanyard pulls safety pin 605 when all the slack is gone, and the device 100 is safely away from the aerial vehicle 205.

Detonator device 600 is enclosed in a case 620 and 625 made of a biodegradable paper pulp, natural fibrous material, and starch. These materials are pressed under high pressure and heat into a milled mold to form the top 625 and bottom 620 halves of detonator device 600. The detonator device 600 is made as small as practically possible to reduce cargo weight. It is formed to fit in pocket 120 on the outside of the system 100.

Figure 6B:
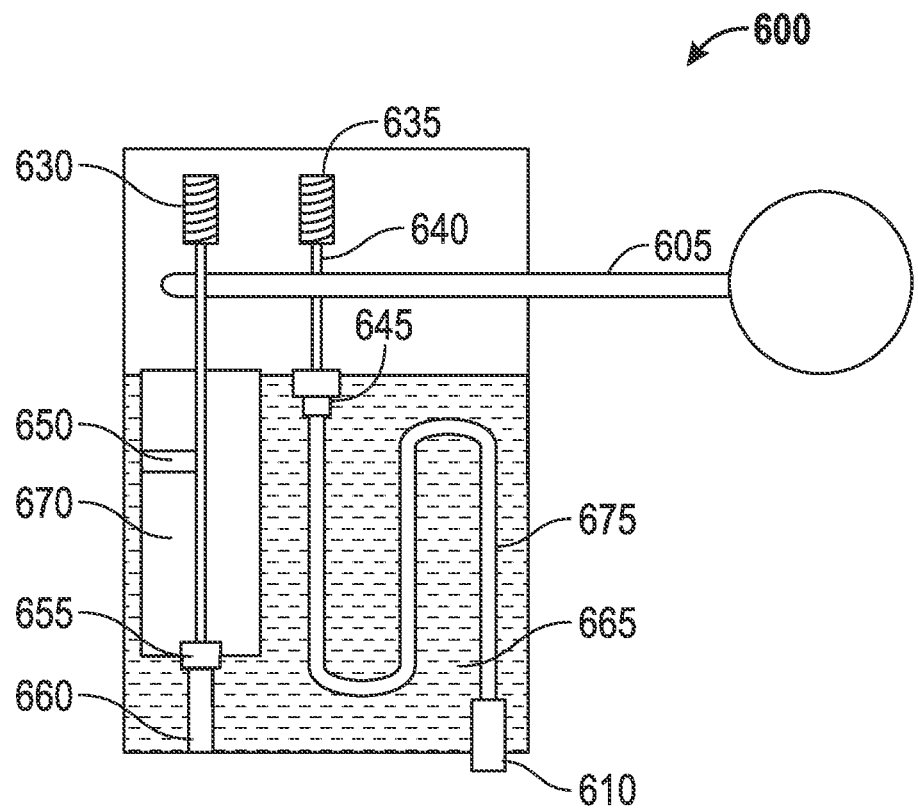
FIG. 6b depicts an internal top view of a detonation device.

FIG. 6b shows a schematic view of the internal components in detonator device 600. Detonator device 600 is configured with both a primary time delayed trigger 665 and a secondary impact trigger 670. The primary time delayed trigger 665 is intended to detonate above a target area, thereby spreading fire retardant 445 above the target area. However, secondary impact trigger 670 serves as a failsafe so that if primary trigger 665 fails, the system still detonates, preventing the possibility of leaving undetonated detonation cord in the target area.

In one embodiment, time delayed trigger 665 is formed to be non-adjustable. In this embodiment, the detonation device 600 will be made to meet the time delay requirement of the specific deployment. Alternatively, time delayed trigger 665 can be formed to be adjusted on scene by a munitions expert to account for varying time delay needs.

Time delayed trigger 665 includes a port 610 for receiving detonator cord 510, and in particular length 515a. A time delayed fuse 675 is further intended to connect with port 610. The length of fuse 675 determines the associated time delay. Fuse 675 is operably connected to a primer 645 which is activated by firing pin 640 and firing spring 635 causing the detonation of detonator cord 510.

If the primary time delayed trigger 665 fails to fire, secondary impact trigger 670 is activated upon contact with a target area. Secondary impact trigger 670 has a port 660 formed for receiving detonator cord 510 and in particular length 515b. A primer cap 655 is then formed to ignite upon activation of counterweighted firing pin 650, which is activated with firing spring 630. As shown above, both firing springs 630 and 635 and the associated primary time delayed trigger 665, and secondary impact trigger 670, cannot be activated until safety pin 605 is removed.

FIG. 7 depicts logical operational steps 700 associated with an aerial delivery of fire retardant, in accordance with another embodiment of the invention. The method begins at block 705. First at block 710, the exterior shell 105 can be constructed of biodegradable material, preferably formed from a honeycombed cardboard structure with substrates on the top and bottom. This structure has an excellent strength to weight/material ratio and can be shipped flat and in bulk, to a fire fighting staging area. The honeycomb structure can further be filled with seed as shown at block 712. The seed can be selected to effectively reseed the area destroyed by the fire.

Next, as depicted by block 714, the biodegradable bladder 405 can be formed. The bladder is made of a thin biodegradable plastic or other such biodegradable material and includes sleeves 415 and 420 for filling the bladder with fire retardant 445. As with the exterior shell 105, the internal bladder 405, and the detonation cord assembly, including the detonation device 600, can be shipped, in bulk, to a fire fighting staging area as described at block 716.

Once the exterior shell 105 and bladder 405 arrive at a staging area, the biodegradable bladder 405 can be inserted into the exterior shell 105, as shown at block 718. With a single forceful upward motion as illustrated by arrow 305, the collapsed exterior shall 105 can be pulled into its expanded form. The expanded assembly 100 is then secured around the midsection with a biodegradable twine or other such material.

The structure is now stable and is ready to be filled with fire retardant 445, as described at block 720. The sleeves 415 and 420 are fitted through ports 110 and 115 respectively to allow nozzle 410a or 410b to release fire retardant 445 into the system 100. Once the system is full, the ports are capped with caps and/or the sleeves are tied.

Next at block 722, the assembled system 100 is loaded onto an aerial vehicle 205 for delivery to a target area. In general, multiple systems 100 can be loaded onto an aerial vehicle 205 for multiple drops on a single run. The systems 100 should be secured in the aerial vehicle to prevent sliding or other such unwanted movement within the cargo area.

As the aerial vehicle 205 approaches the drop zone, the payload is prepared for deployment, illustrated by block 724. This can include calibrating the time delayed trigger 665. The aerial vehicle 205 is positioned at a height above the target area such that the time delay trigger 665 will detonate the detonator cord 510 at the desired height above the target area.

Finally, the detonator device 600 and detonator cord 510 are operably connected and the detonator device 600 is installed in the pocket 120, as shown at block 726. This step is preformed just before deployment to avoid accidental activation of the detonation cord 510.

When given the signal, an operator ejects the system 100 from the aerial vehicle 205, as shown at block 728. As the system 100 clears the cargo ramp, a lanyard pulls safety pin 605 effectively arming the detonator device 600 as it falls away from the aerial vehicle 205.

Upon expiration of the time delay, at block 730, the detonator device triggers the detonator cord 510. A small detonation fragments the shell and bladder releasing the fire retardant 445 and seed over the target area. The method ends at block 735.

It should be appreciated that the components associated with the system 100 are selected to be biodegradable and environmentally friendly. Thus, the material scattered upon detonation of the system do not leave unwanted environmentally harmful products scattered across the target area. The components are further selected to meet environmental protections standards where applicable.

Based on the foregoing, it can be appreciated that a number of embodiments, preferred and alternative, are disclosed herein. For example, in one embodiment, a system comprises an exterior shell with at least one input port, at least one output port, and at least one pocket. At least two skids are affixed to the bottom of the exterior shell and a bladder is formed inside the exterior shell. A detonation cord affixed to the bladder and a detonation device is arranged in the at least one pocket and operably connected to the detonation cord configured to release a liquid contained in the bladder.

In an alternative embodiment, the system comprises an aerial vehicle configured to deliver the device to a desired location. The exterior shell comprises a biodegradable cardboard and the bladder comprises biodegradable plastic. A plurality of biodegradable plastic strips are affixed to the bladder and formed to secure the detonation cord to the bladder.

In another embodiment, the system further comprises a biodegradable detonation device with at least one primary timed trigger and at least one secondary impact trigger.

In yet another embodiment of the system, at least one input port and at least one output port are formed on the exterior shell and configured to accept a nozzle of a hose, and at least one bladder input port and at least one bladder output port are formed on the bladder and aligned to fit with the input port and the output port of the exterior shell. The biodegradable cardboard is filled with seed.

In another embodiment, a method comprises forming an assembly comprising an exterior shell to hold an interior bladder wherein the bladder is fitted with a detonation device and is filled with a fluid. The method includes releasing the assembly over a fire and detonating the detonator cord with the detonation device affixed to said exterior shell at a desired height above a ground surface.

In another embodiment, the exterior shell comprises a biodegradable cardboard and the bladder comprises a biodegradable plastic. The method further comprises securing the detonator cord to the bladder with biodegradable plastic strips, and further comprises a biodegradable detonation device with at least one primary timed trigger and at least one secondary impact trigger.

In yet another embodiment, the method further comprises configuring an input port and an output port on the exterior shell, aligning the input port and the output port with a bladder input port and a bladder output port formed on the bladder, and forming the input port and the output port to accept a nozzle of a hose.

In another embodiment, the method comprises filling the exterior shell with seed, shipping the exterior she and the interior bladder separately, and inserting the interior bladder in the exterior shell.

In another embodiment, an apparatus comprises an exterior shell with at least one input port, at least one output port, and at least one pocket wherein the input port and the output port are formed to accept a nozzle of a hose. At least two skids are affixed to the bottom of the exterior shell. A bladder is formed inside the exterior shell with at least one bladder input port and at least one bladder output port aligned to fit with the input port and the output port of the exterior shell. A detonation cord is affixed to the bladder and a detonation device is arranged in the at least one pocket and operably connected to the detonation cord configured to release a liquid contained in the bladder.

In another embodiment, the apparatus comprises an aerial vehicle configured to deliver the apparatus to a desired location. The exterior shell comprises a biodegradable cardboard and the bladder is comprised of biodegradable plastic. The apparatus can also include a plurality of biodegradable plastic strips affixed to the bladder and formed to secure the detonation cord to the bladder.

In another embodiment, the detonation device further comprises a biodegradable detonation device with at least one primary timed trigger and at least one secondary impact trigger, and the biodegradable cardboard is filled with seed.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A system comprising:
   an exterior independently collapsible shell with at least one input port, at least one output port, and at least one detonation device pocket;
   At least two skids affixed to the bottom of said exterior shell;
   a bladder formed inside said exterior shell;
   a detonation cord affixed to said bladder; and
   a biodegradable detonation device comprising at east one primary timed trigger and at least one secondary impact trigger, arranged in said at least one detonation device pocket and operably connected to said detonation cord, said at least one primary timed trigger configured to trigger the detonation of said detonation cord at the expiration of a time delayed fuse, wherein the expiration of the time delayed fuse is selected to correspond with a predetermined height, and said secondary impact trigger configured as a fail safe trigger that is triggered on impact with a ground surface.

2. The system of claim 1 further comprising an aerial vehicle configured to deliver said device to a desired location.

3. The system of claim 1 wherein said exterior shell comprises a biodegradable honeycomb cardboard substrate; a biodegradable cardboard top layer; and a biodegradable cardboard bottom layer; and wherein said bladder comprises biodegradable plastic.

4. The system of claim 3 further comprising:
   a plurality of biodegradable plastic strips affixed to said bladder and formed to secure said detonation cord to said bladder.

5. The system of claim 3 wherein at least one input port and at least one output port are formed on said exterior shell and configured to accept a nozzle of a hose; and
   at least one bladder input port and at least one bladder output port are formed on said bladder and aligned to fit with said input port and said output port of said exterior shell.

6. The system of claim 3 wherein voids in said honeycomb cardboard of said biodegradable shell are filled with seed.

7. A method comprising:
   forming an assembly comprising an independently collapsible exterior shell to hold an interior bladder wherein said exterior shell is fitted with a biodegradable detonation device;
   filling said bladder with a fluid;
   releasing said assembly over a fire; and
   detonating a detonator cord with said biodegradable detonation device comprising at least one primary timed trigger and at least one secondary impact trigger said at least one primary timed trigger configured to trigger the detonation of said detonation cord at the expiration of a time delayed fuse, wherein the expiration of the time delayed fuse is selected to correspond with a predetermined height, and said secondary impact trigger is configured as a fail safe trigger that is triggered on impact with a ground surface.

8. The method of claim 7 wherein said exterior shell comprises a biodegradable honeycomb cardboard substrate; a biodegradable cardboard top layer; and a biodegradable cardboard bottom layer; and wherein said bladder comprises a biodegradable plastic.

9. The method of claim 7 further comprising:
   securing said detonator cord to said bladder with biodegradable plastic strips.

10. The method of claim 7 further comprising:
    configuring an input port and an output port on said exterior shell;
    aligning said input port and said output port with a bladder input port and a bladder output port formed on said bladder; and
    forming said input port and said output port to accept a nozzle of a hose.

11. The method of claim 7 further comprising:
filling voids in said honeycomb cardboard of said exterior shell with seed.

12. The method of claim 7 further comprising:
shipping said exterior shell and said interior bladder separately; and
inserting said interior bladder in said exterior shell.

13. An apparatus comprising:
an independently collapsible exterior shell with at least one input port, at least one output port, and at least one detonation device pocket wherein said input port and said output port are formed to accept a nozzle of a hose;
At least two skids affixed to the bottom of said exterior shell;
a bladder formed inside said exterior shell with at least one bladder input port and at least one bladder output port aligned to fit with said input port and said output port of said exterior shell;
a detonation cord affixed to said bladder; and
a biodegradable detonation device comprising at least one primary timed trigger and at least one secondary impact trigger, arranged in said at least one detonation device pocket and operably connected to said detonation cord, said at least one primary timed trigger configured to trigger the detonation of said detonation cord at the expiration of a time delayed fuse, wherein the expiration of the time delayed fuse is selected to correspond with a predetermined height and said secondary impact trigger configured as a fail safe trigger that is triggered on impact with a ground surface.

14. The apparatus of claim 13 further comprising an aerial vehicle configured to deliver said apparatus to a desired location.

15. The apparatus of claim 13 wherein said exterior shell comprises a biodegradable honeycomb cardboard substrate; a biodegradable cardboard top layer; and a biodegradable cardboard bottom layer; and wherein said bladder comprises biodegradable plastic.

16. The apparatus of claim 15 further comprising:
a plurality of biodegradable plastic strips affixed to said bladder and formed to secure said detonation cord to said bladder.

17. The apparatus of claim 15 voids in said honeycomb cardboard of said biodegradable shell are filled with seed.

\* \* \* \* \*